(12) United States Patent
Shimada

(10) Patent No.: US 7,214,162 B2
(45) Date of Patent: May 8, 2007

(54) VEHICLE CONTROL APPARATUS

(75) Inventor: Tetsuya Shimada, Kitakatsushika-gun (JP)

(73) Assignee: Nissan Motor Co., Ltd., Yokohama (JP)

( * ) Notice: Subject to any disclaimer, the term of this patent is extended or adjusted under 35 U.S.C. 154(b) by 211 days.

(21) Appl. No.: 11/065,542

(22) Filed: Feb. 25, 2005

(65) Prior Publication Data

US 2005/0239597 A1     Oct. 27, 2005

(30) Foreign Application Priority Data

Apr. 27, 2004     (JP)     ............................. 2004-131203

(51) Int. Cl.
*B60W 10/04*     (2006.01)
(52) U.S. Cl. .................................................. 477/107
(58) Field of Classification Search ................ 477/107, 477/110
See application file for complete search history.

(56) References Cited

U.S. PATENT DOCUMENTS

| | | | | |
|---|---|---|---|---|
| 5,291,979 A | * | 3/1994 | Iizuka | ........................ 192/92 |
| 5,580,331 A | * | 12/1996 | Shiraishi et al. | ............. 477/109 |
| 5,669,849 A | * | 9/1997 | Tabata et al. | ................ 477/109 |
| 6,077,188 A | * | 6/2000 | Futamura et al. | ............. 477/65 |

FOREIGN PATENT DOCUMENTS

| | | |
|---|---|---|
| JP | H8-11591 A | 1/1996 |
| JP | 9-196086 * | 7/1997 |
| JP | P2001-32846 A | 11/2001 |

* cited by examiner

*Primary Examiner*—Ha Ho
(74) *Attorney, Agent, or Firm*—Global IP Counselors

(57) ABSTRACT

A vehicle control apparatus is provided to synchronize the engine rotational speed during a gear shifting operation of a transmission by feedback-controlling the engine rotational speed at a level of response that is well-suited to the needs of the driver. When the transmission downshifts under conditions in which a brake switch is OFF and an accelerator pedal is completely released, the feedback gain used to feedback-control the engine rotational speed is set in such a manner that the engine rotational speed converges in a stable manner toward a target rotational speed (synchronization rotational speed) and gear shift shock is alleviated. Meanwhile, when the transmission downshifts under conditions in which the brake switch is ON or the accelerator pedal is depressed, the feedback gain is set in such a manner that the engine rotational speed approaches the target rotational speed quickly and a high gear shift response is ensured.

16 Claims, 7 Drawing Sheets

VEHICLE CONTROL APPARATUS

CROSS-REFERENCE TO RELATED APPLICATIONS

This application claims priority to Japanese Patent Application No. 2004-131203. The entire disclosure of Japanese Patent Application No. 2004-131203 is hereby incorporated herein by reference.

BACKGROUND OF THE INVENTION

1. Field of the Invention

The present invention generally relates to a vehicle control apparatus. More specifically, the present invention relates to a vehicle control apparatus for temporarily disengaging or releasing a clutch when the transmission shifts gears and to feedback-control the rotational speed of the engine while the clutch is in a released state or disengaged.

2. Background Information

Japanese Laid-open Patent Publication No. 2001-328461 discloses a control device for a vehicle equipped with an engine, a transmission, and a clutch for transmitting power from the engine to the transmission. The control device disclosed in this publication is configured to release the clutch momentarily when the transmission downshifts and to feedback-control the rotational speed of the engine to a synchronization rotational speed while the clutch is in a released state.

In view of the above, it will be apparent to those skilled in the art from this disclosure that there exists a need for an improved vehicle control apparatus. This invention addresses this need in the art as well as other needs, which will become apparent to those skilled in the art from this disclosure.

SUMMARY OF THE INVENTION

It has been discovered that alleviating gear shift shock and securing good gear shift response are conflicting requirements. There are some situations in which it is preferable to give priority to gear shift response, while there are other situations in which it is preferable to give priority to alleviating gear shift shock. The previously disclosed control mentioned above does not take this difference in priority into account when executing the rotational speed control.

Since the previously disclosed control method ignores the difference in priority, the rotational speed control is the same for each situation. For example, the control method is the same whether the transmission downshifts while the driver is depressing the accelerator in order to prepare for acceleration or whether the transmission downshifts without the brakes being operated because the driver recognized a red traffic light ahead and released the accelerator. Consequently, there are cases in which the downshift response is slow when the transmission downshifts in preparation for acceleration, and thus, the acceleration response is poor. Conversely, there are cases in which the downshift response is unnecessarily fast even though the situation does not require a high gear shift response speed and gear shift shock occurs, which results in an uncomfortable feeling for the driver.

The present invention was conceived in light of the above problems. One object of the present invention is to provide a vehicle control apparatus capable of executing engine rotational speed synchronizing control that takes into account whether the vehicle is operating in a state in which it is preferable to give priority to alleviating gear shift shock even if doing so causes the gear shift time to become longer or a state in which it is preferable to shift gears in a short amount of time even if doing so causes some degree of gear shift shock to occur and adapts appropriately.

In view of the foregoing, one aspect of the present invention is to provide a vehicle control apparatus that basically comprises a shift detecting section, a clutch element control section, an operating conditions detecting section and an engine rotational speed control section. The shift detecting section is configured to detect a shift being requested. The clutch element control section is configured to selectively operate a clutch element operatively coupled to an output of an engine to perform a gear shift operation. The operating conditions detecting section configured to detect a vehicle operating condition effecting the gear shift operation. The engine rotational speed control section is configured to selectively conduct feedback control to adjust an engine rotational speed to a target rotational speed while the clutch element is selectively operated during the gear shift operation. The engine rotational speed control section being is further configured to set a responsiveness with which the engine rotational speed is adjusted toward the target rotational speed in a variable manner depending on the vehicle operating condition.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
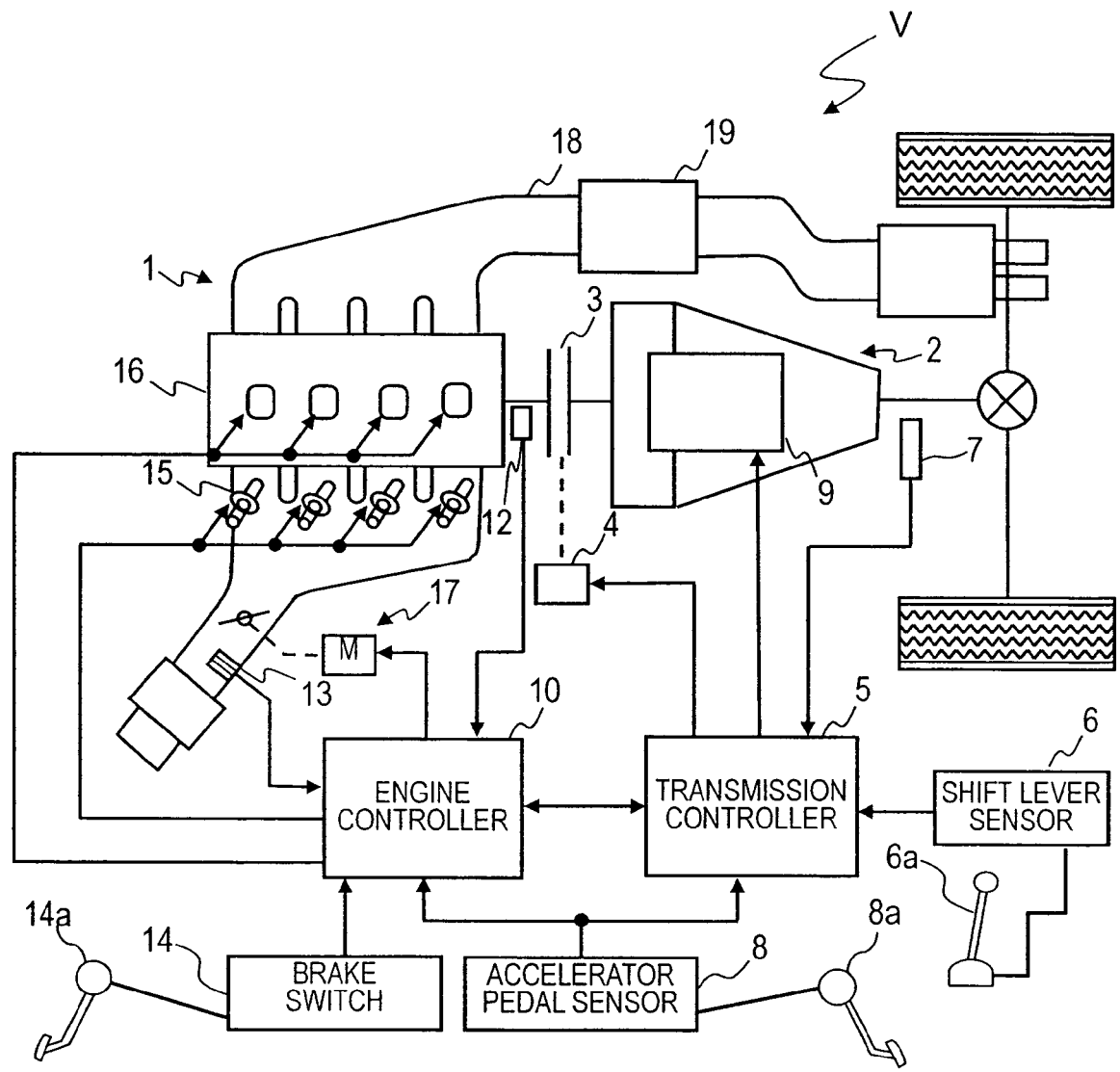
FIG. 1 is a simplified schematic block diagram of a vehicle equipped with a powertrain having a transmission that is controlled by a vehicle control apparatus in accordance with a preferred embodiment of the present invention.

Referring initially to FIG. 1, a vehicle V is schematically illustrated that is equipped with a powertrain and a vehicle control apparatus in accordance with a first embodiment of the present invention. The powertrain in this embodiment basically includes, among other things, an internal combustion (gasoline) engine 1 and a transmission 2 and a clutch element such as a friction clutch 3. The friction clutch 3 is disposed between the output shaft of the engine 1 and the input shaft of the transmission 2 to selectively engage and disengage the engine 1 from the transmission 2. The friction clutch 3 is released and engaged (i.e., disconnected and connected) by a clutch actuator 4.

The vehicle control apparatus in this embodiment basically includes, among other things, a clutch actuator 4, a transmission controller 5, a gearshift lever sensor 6, a vehicle speed sensor 7, an accelerator pedal sensor 8, a transmission or shift actuator 9, an engine controller 10, an engine rotational speed sensor 12, an air flow meter 13 and a brake switch 14.

In particular, the transmission controller 5 is configured to control the engagement and disengagement of the friction clutch 3 and the shifting of the transmission 2 in conjunction with the engine controller 10. The friction clutch 3 is switched between engaged and disengaged states by the transmission controller 5 actuating the clutch actuator 4. The transmission controller 5 includes, among other things, a microcomputer that is configured to receive input of gearshift position selection signals from the shift lever sensor 6, vehicle speed (VSP) signals from the vehicle speed sensor 7, accelerator position (APO) sensor signals from the accelerator pedal sensor 8, and so forth.

When a gear shift is required or requested by the vehicle driving conditions or the intentions of the driver (movement of a shifter 6a), the transmission controller 5 disengages the friction clutch 3 by controlling the clutch actuator 4, and controls the shift actuator 9 while the friction clutch 3 is disengaged, thereby shifting to the required gear position (gear ratio) corresponding to the gear shift request.

Additionally, while the friction clutch 3 is disengaged (the released state), the transmission controller 5 issues an engine rotational speed control command to the engine controller 10 (described later) requesting the engine controller 10 to control the engine rotational speed such that the actual engine rotational speed is adjusted to a target rotational speed. Then, when the engine controller 10 issues a signal indicating that the engine rotational speed control is finished (i.e., that synchronization of the engine rotational speed has been completed), the transmission controller 5 controls the clutch actuator 4 such that the friction clutch 3 is reengaged and thereby finishes the gear shift operation.

The engine controller 10 includes among other things a microcomputer that is configured and arranged such that it can communicate with the transmission controller 5. Accelerator position sensor signals from the accelerator pedal sensor 8 of an accelerator pedal 8a, engine rotational speed signals from the engine rotational speed sensor 12, intake air quantity signals from the air flow meter 13, braking signals from the brake switch 14 that turns ON when a brake pedal 14a is operated and so forth are inputted to the engine controller 10.

Based on the detection signals from the various signals, an engine rotational speed control request transmitted from the transmission controller 5, and a signal indicating the type of gear shift (gear change) transmitted from the transmission controller 5, the engine controller 10 controls fuel injection performed by a fuel injection valve 15, ignition timing performed by a timing device 16 with a plurality of spark plugs, and a throttle opening degree of an electronic throttle 17 that is driven (i.e., opened and closed) by a motor M.

While the transmission controller 5 and the engine controller 10 are illustrated as being separate components, these controllers can be composed of, for example, a single microcomputer (with one or more chips that realize functions of the present invention) having various timer functions, a CPU, ROM, RAM, digital ports, and A/D ports, as well as a high-speed communication circuit and other components. It will be apparent to those skilled in the art from this disclosure that the precise structure and algorithms for the transmission controller 5 and the engine controller 10 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Basically, with the transmission controller 5 of the present invention, when the approach speed (responsiveness) with which the engine rotational speed is adjusted toward the target rotational speed (synchronization rotational speed) is decreased, the stability with which the engine rotational speed converges toward the target rotational speed (synchronization rotational speed) is increased and the gear shift shock reduction effect becomes larger. Meanwhile, the time required to reach the vicinity of the target rotational speed becomes longer, causing the overall gear shift time to become longer and the gear shift response to decrease.

Conversely, when the approach speed (responsiveness) with which the engine rotational speed is adjusted toward the target rotational speed (synchronization rotational speed) is increased, the response with which the engine rotational speed reaches the vicinity of the target rotational speed (synchronization rotational speed) increases, i.e., the gear shift response improves. Meanwhile, however, the stability with which the engine rotational speed converges toward the target rotational speed (synchronization rotational speed) declines and the gear shift shock reducing effect becomes smaller.

Figure 2:
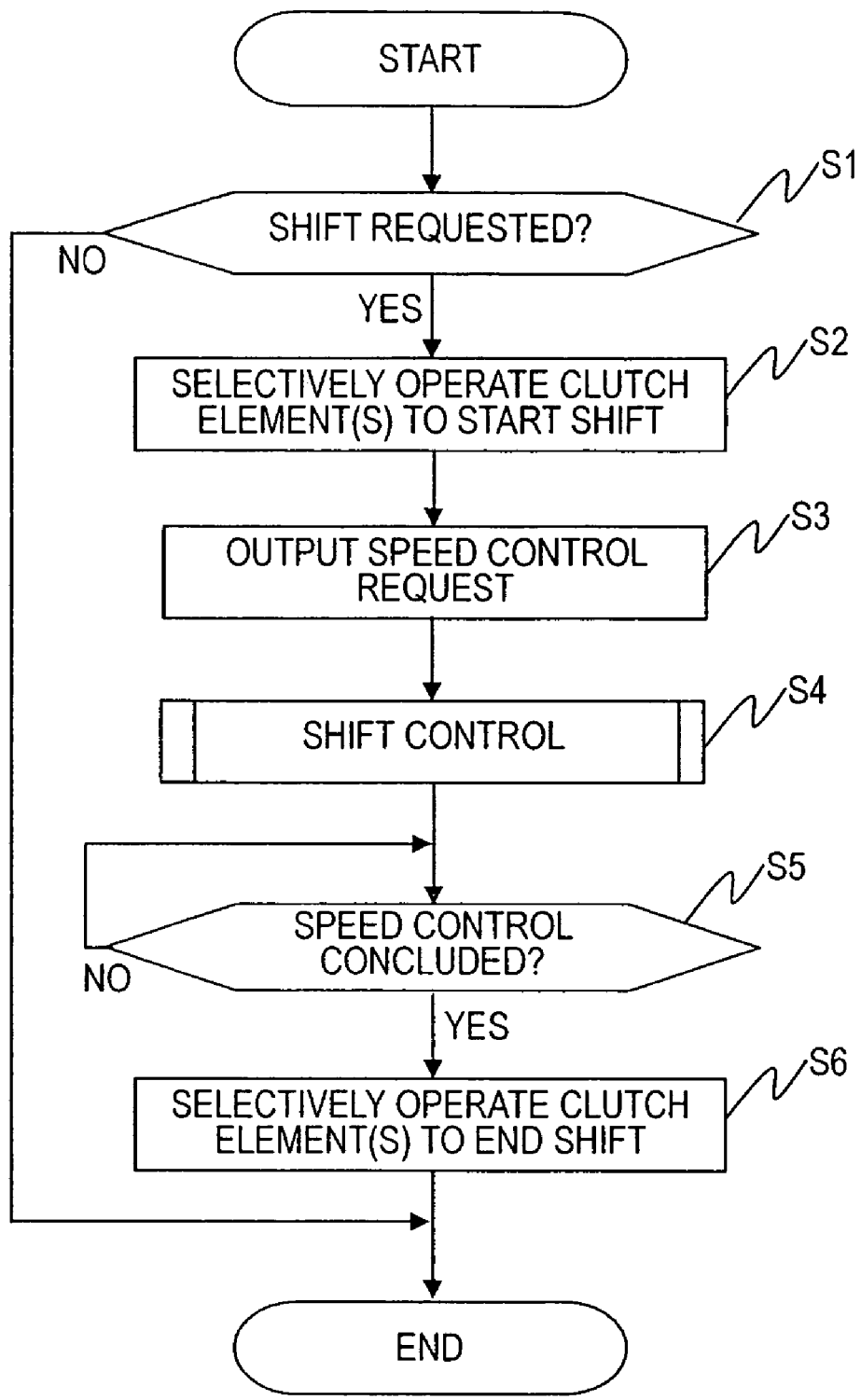
FIG. 2 is a flowchart explaining the gear shift control operations executed by the transmission controller illustrated in FIG. 1 in accordance with the first embodiment of the present invention.

Since the approach speed (responsiveness) with which the engine rotational speed is adjusted toward the target rotational speed (synchronization rotational speed) is set in such a manner as to vary in accordance with the vehicle operating conditions, the gear shift response can be adjusted so as to accommodate the demands of different operating conditions. As a result, the rotational speed of the engine can be controlled in such a manner as to satisfy the requirements of both situations in which it is more important to have a fast gear shift response than to alleviate gear shift shock and situations in which it is more important to alleviate gear shift shock than to have a fast gear shift response. The gear shift control functions of the transmission controller 5 will now be described with reference to the flowchart in FIG. 2.

First, in step S1, the transmission controller 5 determines whether or not there is a shift request for shifting gears. In this embodiment, the processing of step S1 constitutes a shift detecting section that is configured to detect a shift being requested or required. If there is a shift request, that is, if the current gear is different from the gear required by vehicle operation conditions or the driver's intentions, the control routine proceeds to step S2.

In step S2, the transmission controller 5 selectively operates (releases) the friction clutch 3 such that the friction clutch 3 is disengaged in response to the detection of a shift request. Once the friction clutch 3 is disengaged, the control proceeds to step S3.

In step S3, the transmission controller 5 issues an engine rotational speed control request to the engine controller 10 to control the engine rotational speed during the shifting by the transmission controller 5. In this embodiment, the processing of step S3 constitutes an engine rotational speed control section that is configured to selectively conduct engine rotational speed control to adjust an engine rotational speed to a target speed while the clutch element (friction clutch 3) is selectively operated during the gear shift operation. The engine rotational speed control operation is executed by the engine controller 10 in accordance with an engine rotational speed control program as shown in the flow charts of FIGS. 3, 5 and 6 as discussed below.

In step S4, the transmission controller 5 controls the shift actuator 9 so as to shift to the requested gear position (gear ratio) as required by the vehicle operation conditions or the driver's intentions.

In step S5, the transmission controller 5 determines if the engine controller 10 has issued an end signal for the engine rotational speed control. The transmission controller 5 waits until the end signal is issued before proceeding to step S6. In other words, in step S5, the transmission controller 5 determines whether or not an engine rotational speed control end signal has been outputted from the engine controller 10. Once the transmission controller 5 determines that engine rotational speed control end signal has been outputted from the engine controller 10, the control moves to step S6.

In step S6, the transmission controller 5 selectively operates the friction clutch 3 such that the friction clutch 3 is engaged. Specifically, the transmission controller 5 outputs a signal to the clutch actuator 4 to engage the friction clutch 3, which concludes the gear shift control. In this embodiment, the processing of steps S2 and S6 constitute a clutch element control section that is configured to selectively operate a clutch element (the friction clutch 3) operatively coupled to an output of an engine to perform a gear shift operation.

Figure 3:
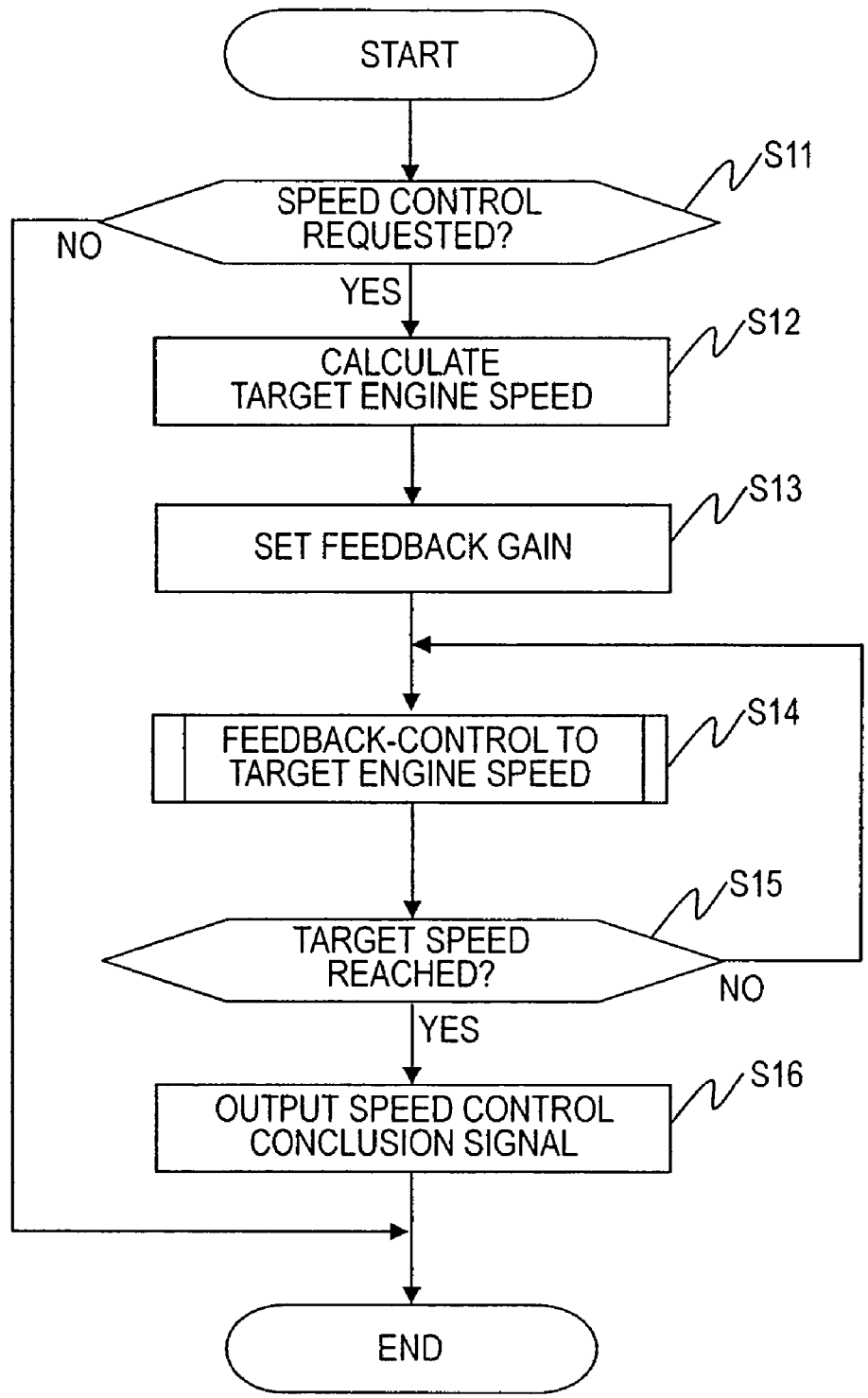
FIG. 3 is a flowchart explaining the engine rotational speed control operations executed by the engine controller during gear shifting operations by the transmission controller illustrated in FIG. 1 in accordance with the first embodiment of the present invention.
Figure 4:
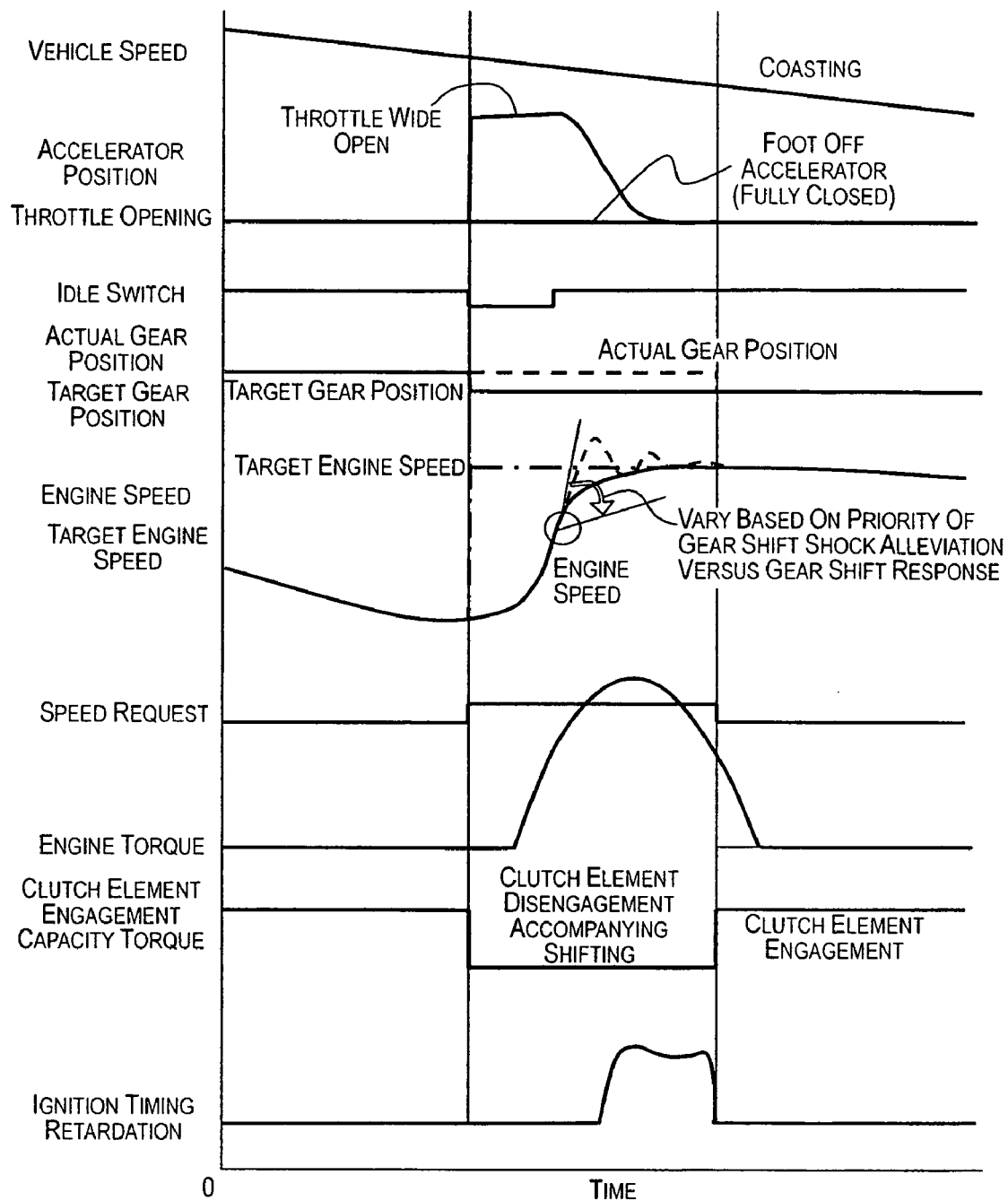
FIG. 4 is a time chart illustrating the control characteristics of the engine rotational speed control executed during gear shifting operations by the transmission controller illustrated in FIG. 1 in accordance with the first embodiment of the present invention.

The flowchart shown in FIG. 3 describes the engine rotational speed control executed by the engine controller 10 when it receives an engine rotational speed control request from the transmission controller 5. The time chart shown in FIG. 4 illustrates the changes in the various data during this engine rotational speed control.

In step S11 of the flowchart of FIG. 3, the engine controller 10 determines whether or not an engine rotational speed control request has been transmitted from the transmission controller 5. Once the engine controller 10 detects that an engine rotational speed control request has been transmitted, the control routine proceeds to step S12.

In step S12, the target engine rotational speed is calculated by the engine controller 10 on the basis of the gear position or ratio requested, the vehicle speed at that point in time, and so forth.

In step S13, the engine controller 10 is configured to set the gain to be used in the feedback control for matching the actual engine rotational speed to the target rotational speed.

The details of the processing steps used to set the gain in step S13 will now be described with reference to the flowchart shown in FIG. 5.

Figure 5:
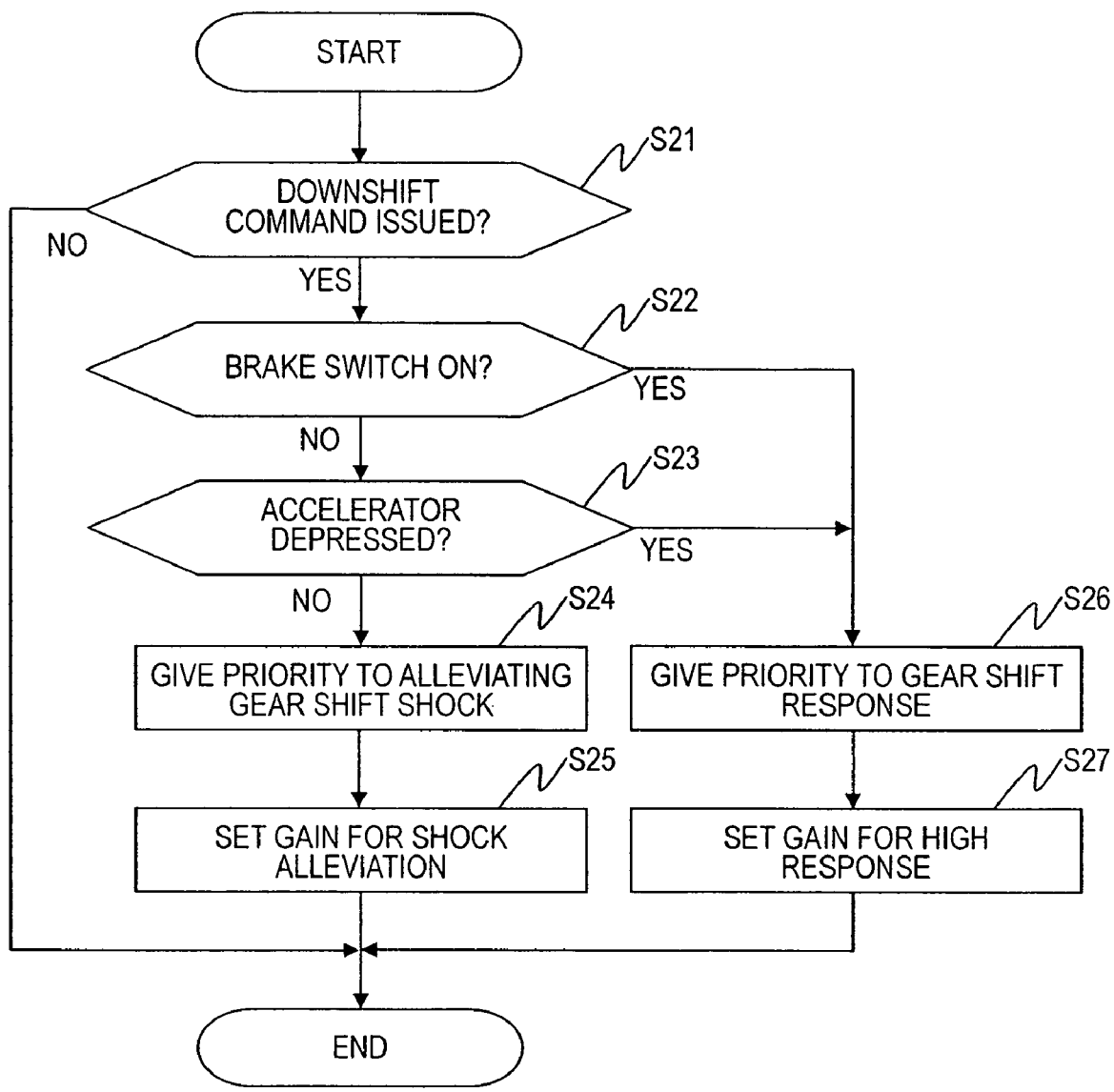
FIG. 5 is a flowchart explaining the processing used to set the feedback control gain in accordance with the first embodiment of the present invention.

In step S21 of the flowchart of FIG. 5, the engine controller 10 determines if the gear shift (change of gears) will be a downshift. If a downshift command has been issued due to either a gear ratio required by vehicle operation conditions or a driver's intentions, the control routine proceeds to step S22. If the engine controller 10 determines that no downshift command has been issued, then the control routine ends.

In step S22, the engine controller 10 determines if the brake switch 14 is ON, which indicates that the brakes are being operated. If the brake switch 14 is OFF, indicating the brakes are not being operated, then the engine controller 10 proceeds to step S23 where the engine controller 10 determines if the accelerator position detected by the accelerator pedal sensor 8 corresponds to a completely released state of the accelerator pedal 8a. If the brakes are not being operated and the accelerator pedal 8a is in a completely released state, then the engine controller 10 proceeds to step S24.

In step S24, the engine controller 10 determines that the operating conditions are such that alleviation of gear shift shock should be given priority. Thus, the engine controller 10 determines that it is acceptable for the time required to complete the gear shift to be somewhat longer than if priority is given to the gear shift response. One example of a situation in which the transmission downshifts under conditions in which the brakes are not being operated and the accelerator pedal 8a is completely released is one in which the driver recognizes a red traffic light ahead and releases the accelerator pedal 8a but does not apply the brakes. Another example of a situation in which the transmission downshifts under conditions in which the brakes are not being operated and the accelerator pedal 8a is completely released is one in which the driver releases the accelerator pedal 8a in order to decelerate and match the speed of a preceding vehicle, the downshift being matched to the vehicle speed at that time.

When the driver releases his or her foot from the accelerator pedal 8a and does not depress the brake, the driver's demand for deceleration is low and, thus, a high downshift response speed is not required. If the transmission downshifts with an unnecessarily high response in such a situation and gear shift shock occurs, the driver will experience a particularly uncomfortable feeling because driver expects to decelerate gradually.

Therefore, in step S25, the engine controller 10 sets the gain to be used in the feedback control for matching the actual engine rotational speed to the target rotational speed to a gear shift shock alleviating feedback gain Gs, which is stored in advance and designed to accommodate operating conditions in which alleviating gear shift shock should be given priority even if it results in sacrificing gear shift response.

If the approach speed with which the actual engine rotational speed is adjusted toward the target rotational speed is slow, the time required for the engine rotational speed to reach the target rotational speed will be longer but the actual engine rotational speed will converge toward the target rotational speed in a stable manner without overshooting.

Since the actual engine rotational speed converges toward the target rotational speed in a stable manner without overshooting, the friction clutch 3 can be reconnected under conditions in which the engine rotational speed is stabilized in the vicinity of the target rotational speed and, thus, the gear shift shock can be alleviated in an effective manner.

In short, the gear shift shock alleviating feedback gain Gs is set in advance such that, when it is used, the speed at which the actual engine rotational speed increases toward the target rotational speed is slower than when the high gear-shift-response feedback gain Gr (discussed later) is used. In other words, use of the high gear-shift-response feedback gain Gr results in a first response rate, while use of the gear shift shock alleviating feedback gain Gs results in a second response rate, which is slower than the first response rate.

Meanwhile, the engine controller 10 proceeds to step S26 from step S22 or S23 if the engine controller 10 determines that the brake switch 14 is ON (brakes are being operated) in step S22 or if the engine controller 10 determines that the accelerator pedal 8a is depressed in step S23.

In step S26, the engine controller 10 is configured to determine that the operating conditions are such that gear shifting response (shortness of the time required to complete the gear shift operation) should be given priority over alleviating gear shift shock. One example of a situation in which the transmission downshifts while the brakes are being operated is when the transmission downshifts while the vehicle is turning a downward sloped corner with the brakes depressed. One example of a situation in which the transmission downshifts while the accelerator pedal 8a is depressed is when the transmission downshifts in preparation for acceleration. In either case, the downshift needs to be executed with a high response speed.

In step S27, the engine controller 10 sets the gain to be used in the feedback control for matching the actual engine rotational speed to the target rotational speed to a high gear-shift-response feedback gain Gr which is stored in advance and designed to accommodate operating conditions in which the gear shift response should be given priority and a certain degree of gear shift shock can be tolerated.

If the approach speed with which the actual engine rotational speed is adjusted toward the target rotational speed is fast, the engine rotational speed can be made to reach the target rotational speed quickly and the friction clutch 3 can be reconnected (i.e., the gear shift operation can be completed) at an earlier timing.

Thus, when the operating conditions are such that the gear shift response (shortness of the time required to complete the gear shift operation) should be given priority over alleviating gear shift shock, increasing the speed at which the actual engine rotational speed approaches the target rotational speed enables the required gear shift response to be secured, thus ensuring a highly responsive driving performance.

In short, the high gear-shift-response feedback gain Gr is set in advance such that, when it is used, the speed at which the actual engine rotational speed increases toward the target rotational speed is faster than when the gear shift shock alleviating feedback gain Gs is used.

As will be discussed later, this embodiment is configured to feedback-control the engine rotational speed to the target rotational speed using PID (proportional, integral, and derivative) operations and to use derivative operations to impart a braking effect in the vicinity of the target rotational speed. Thus, the setting value of the approach speed at which the actual engine rotational speed increases toward the target rotational speed is changed by varying at least one of the following: a proportional gain P, an integral gain I, and a derivative gain D.

For example, by adjusting the gains such that the proportional gain Pr for high gear shift response is greater than the proportional gain Ps for gear shift shock alleviation and/or the integral gain Ir for high gear shift response is greater than the integral gain Is for gear shift shock alleviation, the engine rotational speed can be increased at a faster pace and the friction clutch 3 can be reconnected at an earlier timing when a high gear shift response is required and the engine rotational speed can be increased at a slower pace so as to converge toward the target rotational speed in a stable manner when alleviation of gear shift shock is required.

Meanwhile, since the derivative gain used in the derivative operation has a braking effect that serves to suppress the speed at which the actual engine rotational speed approaches the target rotational speed, it is also acceptable to change the derivative gain depending on whether high gear shift response is needed or alleviation of gear shift shock is needed.

The invention is not limited to using PID-based feedback control to control the adjustment of the engine rotational speed to the target rotational speed. For example, it is also acceptable to employ sliding mode feedback control.

The control apparatus can also be configured to: detect the deceleration of the vehicle; determine the demand for (importance of) gear shift response based on the magnitude of the deceleration when the transmission downshifts with the accelerator pedal 8a completely released, the demand for gear shift response being higher when the magnitude of the deceleration is larger; and increase the approach speed with which the engine rotational speed is adjusted toward the target rotational speed in accordance with demand for gear shift response.

Furthermore, the control device can be configured to determine the demand for (importance of) gear shift response based on the accelerator pedal 8a depression amount when the transmission downshifts, the demand for gear shift response being higher when the accelerator pedal 8a depression amount is larger, and to increase the approach speed with which the engine rotational speed is adjusted toward the target rotational speed in accordance with demand for gear shift response.

Figure 6:
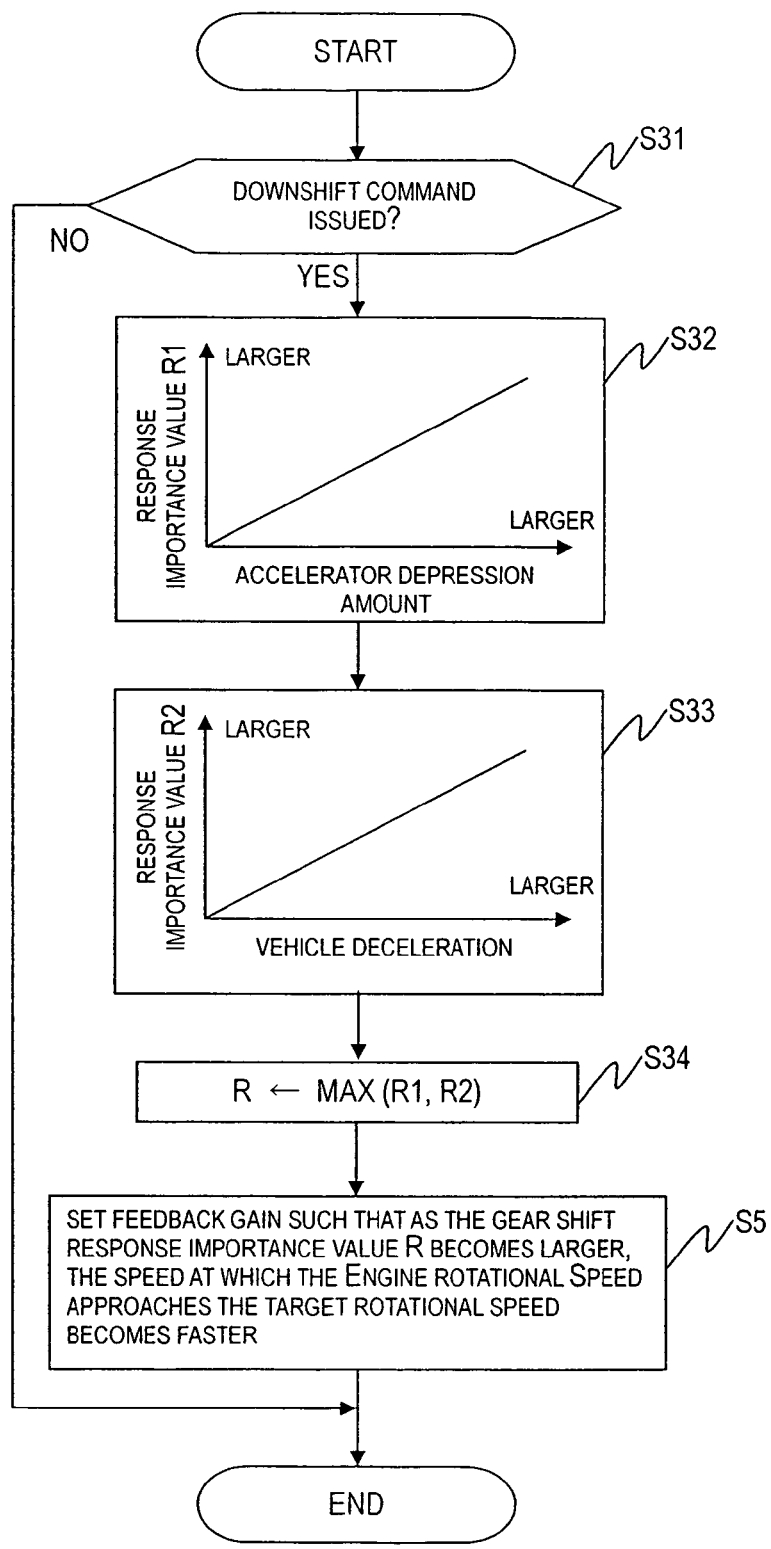
FIG. 6 is a flowchart explaining the processing used to set the feedback control gain in accordance with a second embodiment of the present invention.

The flowchart shown in FIG. 6 illustrates an embodiment in which the feedback gain is set based on the accelerator position and the vehicle deceleration.

In step S31, the engine controller 10 determines if the transmission will downshift. If so, the engine controller 10 proceeds to step S32.

In step S32, the engine controller 10 sets the gear shift response importance value R1 based on the accelerator position at that time.

The gear shift response importance value R1 is set such that the larger the accelerator depression amount is, the larger the value to which the importance value R1 is set.

In step S33, the engine controller 10 sets a gear shift response importance value R2 based on the vehicle deceleration (rate of decrease in the vehicle speed) at that time.

The gear shift response importance value R2 is set such that the larger the vehicle deceleration is, the larger the value to which the importance value R2 is set.

In step S34, the engine controller 10 selects the larger of the gear shift response importance value R1 and the gear shift response importance value R2.

For example, if the transmission will downshift under conditions in which the driver is depressing the accelerator in order to prepare for acceleration, the gear shift response importance value R1 will be set to a larger value and the gear shift response importance value R1 will be selected in step S34. Meanwhile, if the transmission will downshift under conditions in which the driver is depressing the brake pedal and decelerating the vehicle, the gear shift response importance value R2 will be set to a larger value and the gear shift response importance value R2 will be selected in step S34.

Additionally, in a situation in which the driver releases his or her foot from the accelerator pedal 8a and does not depress the brake pedal, thus resulting in a small vehicle deceleration, both the gear shift response importance value R1 and the gear shift response importance value R2 will be small and the effect of the selection will be relatively small even if the larger of the two is selected in step S34.

In step S35, the engine controller 10 sets the gain G to be used in feedback controlling the engine rotational speed, the gain G being set in accordance with the gear shift response importance value R selected in step S34.

In concrete terms, the gain G (i.e., at least one of the following: the proportional gain, the integral gain, and the derivative gain) is set in such a manner that the larger the gear shift response importance value R is, the higher the speed at which the engine rotational speed will approach the target rotational speed.

As a result, when the gear shift response importance value R is large, the speed at which the engine rotational speed approaches the target rotational speed is increased so that the downshift can be completed with a high degree of response. Conversely, when the gear shift response importance value R is small, the speed at which the engine rotational speed approaches the target rotational speed is decreased so that gear shift shock can be suppressed in an effective manner.

The remainder of the flowchart shown in FIG. 3 will now be described.

After the gain to be used for the feedback control is set in step S13, the engine controller 10 proceeds to step S14 where it feedback-controls the throttle opening degree of the electronic throttle 17 so as to match the actual engine rotational speed to the target rotational speed.

As shown in FIG. 4, the feedback control executed during downshifting is configured to first open the throttle fully and hold it open until the difference between the engine rotational speed and the target rotational speed is equal to or less than a prescribed value. Then, at the point in time when the prescribed value is reached, the engine controller 10 shifts to PID feedback control. Since the gain to be used in the PID control is set in step S13 in accordance with the priority of gear shift response versus the alleviation of gear shift shock, the engine rotational speed can be adjusted toward the target rotational speed (synchronization rotational speed) with a degree of response that is well-matched to the intent of the driver at that time. The feedback control of the throttle opening degree is also configured to retard the ignition timing as the engine rotational speed approaches the target rotation speed so as to prevent overshooting of the engine rotational speed.

In step S15, the engine controller 10 determines if the difference between the actual engine rotational speed and the target rotational speed is equal to or less than a convergence determination value. If the difference is equal to or less than the convergence determination value, the engine controller 10 proceeds to step S16.

In step S16 the engine controller 10 outputs a signal to the transmission controller 5 indicating that engine speed control has concluded to the transmission controller 5. Upon receiving this engine speed control conclusion signal, the transmission controller 5 engages or connects the disengaged (released) friction clutch 3 (step S6 of FIG. 2), which concludes the gear shift operation.

Second Embodiment

Figure 7:
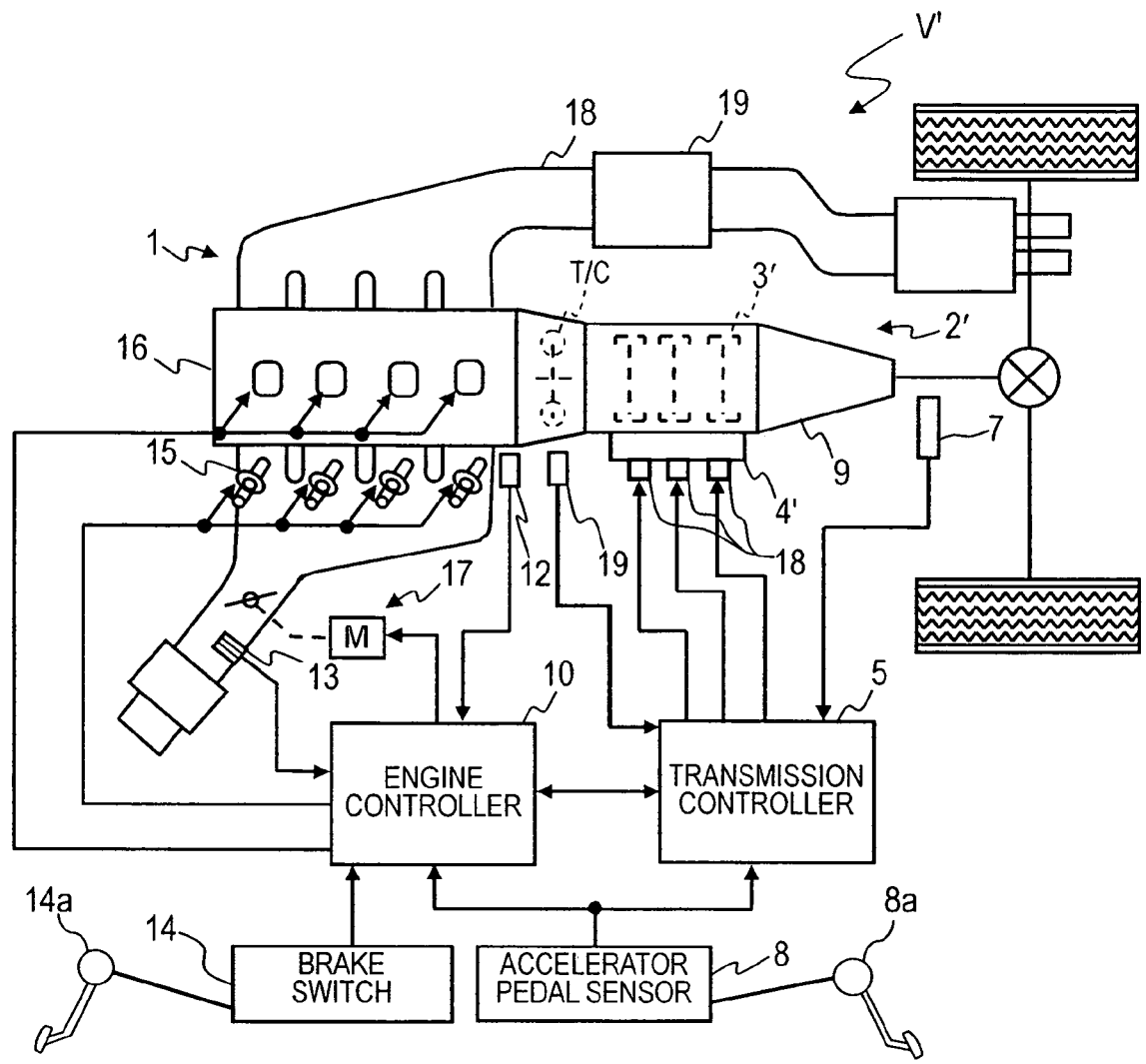
FIG. 7 is a simplified schematic block diagram of a vehicle equipped with a powertrain having an automatic transmission that is controlled by a vehicle control apparatus in accordance with a second embodiment of the present invention.

Referring now to FIG. 7, a simplified schematic block diagram of a vehicle V' equipped with a powertrain having an automatic transmission 2' that is controlled by a vehicle control apparatus in accordance with a second embodiment of the present invention. Basically, the vehicle V' of this second embodiment is identical to the first embodiment, except that the automatic transmission 2' of this second embodiment has been modified relative to the transmission 2 of the first embodiment and the programming of the transmission controller 5 and the engine controller 10 has been modified in view of the automatic transmission 2'. Thus, the shifter 11 has been eliminated from this embodiment. In view of the similarity between the first and second embodiments, the parts and/or processing used in the second embodiment that are identical to the parts and/or processing of the first embodiment will be given the same reference numerals as the parts and/or processing of the first embodiment. Moreover, the descriptions of the parts of the second embodiment that are identical to the parts and/or processing of the first embodiment may be omitted for the sake of brevity.

The automatic transmission 2' is a direct driven automatic transmission that is controlled by the transmission controller 5. The transmission controller 5 is configured to control the shift control functions of the transmission controller 5 using the flowchart in FIG. 2. The automatic transmission 2' directly controls hydraulic pressure being supplied to a plurality of hydraulic clutches and/or a plurality of hydraulic brakes that serve as gear changing friction elements 3' for determining the power transmission path (i.e., the combination of gear cogs used) of the transmission 2'. Accordingly, a control valve 4' is provided that serves to control the gear changing of the automatic transmission 2'. The control valve 4' has a plurality of hydraulic pressure duty solenoids 18 for controlling the selective holding (engagement and/or disengagement) of the friction (clutch) elements 3'. The number of hydraulic pressure duty solenoids 18 equal to the number of gear changing friction elements is provided on the control valve 4' that serves to control the gear changing of the automatic transmission 2'. These gear changing friction elements 3' are clutch elements that are configured and arranged to execute selective holding so as to determine a gear ratio of an automatic transmission 2'. Thus, the shift control functions of the transmission controller 5 carries out the steps of FIG. 2 with steps S2 and S3 detecting the status of the gear changing friction elements, e.g., detecting the status of the hydraulic pressure duty solenoids 18.

The hydraulic pressure duty solenoids 18 are configured to duty-control the hydraulic pressure of each respective friction element individually so as to selectively operate (connect and disconnect) the friction elements, thereby enabling prescribed power transmission paths of the automatic transmission 2' to be selected. The automatic transmission 2' thus delivers the engine power at a gear ratio corresponding to the selected power transmission path.

The drive duties of the duty solenoids 18 are determined by the transmission controller 5. As in the first embodiment, the engine controller 10 receives the accelerator position (APO) signal from the accelerator pedal sensor 8 and the engine speed (Ne) signal from the engine speed sensor 12. The accelerator position (APO) signal from and the engine speed (Ne) signal are transmitted from the engine controller 10 to the transmission controller 5. In this second embodiment, a signal from an input rotational speed sensor 19 that detects the input rotational speed Nt delivered to the automatic transmission 2' from a turbine of a torque converter T/C, and a signal from the vehicle speed (output rotational speed) sensor 7 that detects an output rotational speed No of the automatic transmission 2' that is indicative of the vehicle speed.

In step S4, the control valve 4' is controlled so as to shift to the requested gear position as required by the vehicle operation conditions or the driver's intentions.

The transmission controller 5 executes a well-known program (not shown in figures) based on the aforementioned input signals and controls the gear shifting of the automatic transmission 2' in the following fashion.

First, the accelerator position APO and a vehicle speed VSP computed based on the transmission output rotational speed No are used to find the gear best suited to the current operating conditions by referring to a gear change pattern schedule (not shown). If the best suited gear is the same as the currently selected gear, the transmission controller 5 determines that the gear will not be changed and does not issue a shift command or request. As a result, the drive duty of the duty solenoids 18 remains the same and the currently selected gear is maintained.

If the best suited gear is different from the currently selected gear, the transmission controller 5 issues a shift command and changes the drive duty of the corresponding duty solenoids 18 such that the gear changing friction (clutch) elements 3' are engaged or disengaged as required to change from the currently selected gear to the best suited gear. When a shift command or request is issued, the control routine of FIG. 2 that is executed by the transmission controller 5 proceeds to step S3 so that an engine speed control request is outputted by the transmission controller 5 to the engine controller 10 to control the engine speed during the shifting by the transmission controller 5. The engine speed control operation is executed by the engine controller 10 in accordance with the engine speed control routines as shown in the flow charts of FIGS. 3, 5 and 6 as discussed above.

In step S4, the control valve 4' is controlled so as to shift to the requested gear position as required by the vehicle operation conditions or the driver's intentions.

In step S5, the transmission controller 5 determines whether or not an engine speed control conclusion signal has been outputted from the engine controller 10. Once the transmission controller 5 determines that engine speed control conclusion signal has been outputted from the engine controller 10, the control moves to step S6.

In step S6, the transmission controller 5 outputs a signal to the control valve 4' execute selective holding (engagement and/or disengagement) of the friction (clutch) elements 3', which concludes the shift control.

As used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle control apparatus comprising:
   a shift detecting section configured to detect a shift being requested;
   a clutch element control section configured to selectively operate a clutch element operatively coupled to an output of an engine to perform a gear shift operation;
   an operating conditions detecting section configured to detect a vehicle operating condition effecting the gear shift operation; and
   an engine rotational speed control section configured to selectively conduct feedback control to adjust an engine rotational speed to a target rotational speed by directly controlling the engine while the clutch element is selectively operated during the gear shift operation,
   the engine rotational speed control section being further configured to set a responsiveness with which the engine rotational speed is adjusted toward the target rotational speed in a variable manner depending on the vehicle operating condition.

2. A vehicle control apparatus comprising:
   a shift detecting section configured to detect a shift being requested;
   a clutch element control section configured to selectively operate a clutch element operatively coupled to an output of an engine to perform a gear shift operation;
   an operating conditions detecting section configured to detect a vehicle operating condition effecting the gear shift operation; and
   an engine rotational speed control section configured to selectively conduct feedback control to adjust an engine rotational speed to a target rotational speed while the clutch element is selectively operated during the gear shift operation,
   the engine rotational speed control section being further configured to set a responsiveness with which the engine rotational speed is adjusted toward the target rotational speed in a variable manner depending on the vehicle operating condition, the engine rotational speed control section being further configured to set a first response rate when gear shifting response is determined to be given priority and set a second response rate when alleviating gear shift shock should be given priority.

3. The vehicle control apparatus of claim 2, wherein
the engine rotational speed control section is further configured to selectively set one of the first and second response rates upon detecting a gear downshift operation.

4. The vehicle control apparatus of claim 3, wherein
the operating conditions detecting section is further configured to detect the vehicle operating condition based on at least one of an accelerator position, a brake operation state, and a vehicle deceleration.

5. The vehicle control apparatus of claim 4, wherein
the engine rotational speed control section is further configured to increase the responsiveness if the brakes are being operated during the gear downshift operation.

6. The vehicle control apparatus of claim 4, wherein
the engine rotational speed control section is further configured to increase the responsiveness if an accelerator is being operated during the gear downshift operation.

7. The vehicle control apparatus of claim 4, wherein
the engine rotational speed control section is further configured to decrease the responsiveness if neither a brake is being operated nor the accelerator is being depressed during the gear downshift operation.

8. The vehicle control apparatus of claim 4, wherein
the engine rotational speed control section is further configured to set the responsiveness to a higher value as accelerator operation amount increases during the gear downshift operation.

9. The vehicle control apparatus of claim 4, wherein
the engine rotational speed control section is further configured to set the responsiveness to a higher value as vehicle deceleration increases during the gear downshift operation.

10. The vehicle control apparatus of claim 5, wherein
the engine rotational speed control section is further configured to increase the responsiveness if an accelerator is being operated during the gear downshift operation.

11. The vehicle control apparatus of claim 5, wherein
the engine rotational speed control section is further configured to decrease the responsiveness if neither a brake is being operated nor the accelerator is being depressed during the gear downshift operation.

12. The vehicle control apparatus of claim 6, wherein
the engine rotational speed control section is further configured to decrease the responsiveness if neither a brake is being operated nor the accelerator is being depressed during the gear downshift operation.

13. The vehicle control apparatus according to claim 1, wherein
the clutch element is a clutch configured and arranged to connect and disconnect the output of the engine to and from a transmission.

14. The vehicle control apparatus according to claim 1, wherein
the clutch element is at least one friction elements configured and arranged to execute selective holding so as to determine a gear ratio of an automatic transmission.

15. A vehicle control apparatus comprising:
shift detecting section means for detecting a shift being requested;
clutch element control means for selectively operating a clutch element operatively coupled to an output of an engine to perform a gear shift operation;
operating conditions detecting means for detecting a vehicle operating condition effecting the gear shift operation; and
engine rotational speed control means for selectively conducting feedback control to adjust an engine rotational speed to a target rotational speed by directly controlling the engine while the clutch element is selectively operated during the gear shift operation,
the engine rotational speed control means being further configured to set a responsiveness with which the engine rotational speed is adjusted toward the target rotational speed in a variable manner depending on the vehicle operating condition.

16. A method of performing a vehicle control comprising:
detecting a shift being requested;
selectively operating a clutch element operatively coupled to an output of an engine to perform a gear shift operation;
detecting a vehicle operating condition effecting the gear shift operation;
selectively conducting feedback control to adjust an engine rotational speed to a target rotational speed by directly controlling the engine while the clutch element is selectively operated during the gear shift operation; and
setting a responsiveness with which the engine rotational speed is adjusted toward the target rotational speed in a variable manner depending on the vehicle operating condition.

* * * * *